(12) United States Patent
Back et al.

(10) Patent No.: US 11,623,747 B1
(45) Date of Patent: Apr. 11, 2023

(54) AERIAL UTILITY METER READ SYSTEM AND A CUSTOM UTILITY METER READ EQUIPMENT CARRYING CASE CONFIGURED TO ATTACH TO AN AERIAL DRONE WHILE SECURELY CARRYING OPERABLE WIRELESS RADIO-BASED UTILITY METER READ EQUIPMENT USED TO CONDUCT AERIAL UTILITY METER READS

(71) Applicant: European Dirt Inc, Silt, CO (US)

(72) Inventors: Daryl Back, Silt, CO (US); Casey Thomas Carbone-Marron, Silt, CO (US)

( * ) Notice: Subject to any disclaimer, the term of this patent is extended or adjusted under 35 U.S.C. 154(b) by 12 days.

(21) Appl. No.: 17/713,985

(22) Filed: Apr. 5, 2022

Related U.S. Application Data

(60) Provisional application No. 63/185,251, filed on May 6, 2021.

(51) Int. Cl.
*B64C 39/02* (2023.01)

(52) U.S. Cl.
CPC ...... *B64C 39/024* (2013.01); *B64C 2201/128* (2013.01)

(58) Field of Classification Search
CPC ............ B64C 39/024; B64C 2201/128; B65D 81/127; B65D 5/0227; B65D 5/5004; B65D 2585/6825; B65D 5/3628; B65D 21/0233; B65D 2313/08; G06Q 10/083
See application file for complete search history.

(56) References Cited

U.S. PATENT DOCUMENTS

| | | | | |
|---|---|---|---|---|
| 3,231,079 A * | 1/1966 | Ryan, Jr. | ............. | B65D 81/127 206/594 |
| 5,672,150 A * | 9/1997 | Cox | ...................... | A61F 5/0118 602/20 |
| 6,189,834 B1 * | 2/2001 | Dietz | ........................ | B66C 1/16 244/137.4 |
| 6,259,228 B1 * | 7/2001 | Becker | .................. | H02J 7/0042 320/105 |
| 8,424,680 B2 * | 4/2013 | Fair | ........................ | A45C 11/38 190/110 |
| 8,534,607 B2 * | 9/2013 | Tardiff | ..................... | B64D 1/12 244/137.4 |
| 9,174,738 B1 * | 11/2015 | Roach | ...................... | B64D 1/12 |
| 9,517,838 B1 * | 12/2016 | Howard | .................. | B64C 27/12 |
| 9,619,776 B1 * | 4/2017 | Ford | .................... | G05D 1/0088 |
| 9,663,234 B1 * | 5/2017 | Hanlon | ................. | B64D 17/44 |
| 9,889,941 B1 * | 2/2018 | Erickson | ................ | B64D 17/80 |
| 10,479,503 B2 * | 11/2019 | Sikora | .................. | G05D 1/0858 |
| 11,130,570 B2 * | 9/2021 | Green | .................. | B64C 39/024 |
| 11,174,025 B2 * | 11/2021 | Green | .................. | G06Q 10/083 |
| 11,220,335 B1 * | 1/2022 | Felder | .................. | B64C 39/022 |
| 11,305,179 B1 * | 4/2022 | Wadman | .................. | G06E 1/00 |
| 2008/0277390 A1 * | 11/2008 | Nagura | .................. | B65D 88/542 220/6 |

(Continued)

*Primary Examiner* — Medhat Badawi
(74) *Attorney, Agent, or Firm* — Plager Schack LLP; Mark H. Plager; Stephen Hallberg

(57) ABSTRACT

An aerial utility meter read system and a custom utility meter read equipment carrying case are disclosed. The custom utility meter read equipment carrying case is configured to attach to a drone while securely carrying operable wireless radio-based utility meter read equipment used to conduct aerial utility meter reads.

9 Claims, 10 Drawing Sheets

(56) References Cited

U.S. PATENT DOCUMENTS

| | | | |
|---|---|---|---|
| 2009/0230638 A1* | 9/2009 | Reed | A61G 5/0891 |
| | | | 297/344.22 |
| 2012/0158606 A1* | 6/2012 | Moudy | G06Q 10/083 |
| | | | 705/332 |
| 2013/0277101 A1* | 10/2013 | Judy | H05K 9/0043 |
| | | | 174/378 |
| 2014/0166516 A1* | 6/2014 | Martinez | A45F 5/021 |
| | | | 206/372 |
| 2015/0076202 A1* | 3/2015 | Jensen | A45F 3/04 |
| | | | 224/645 |
| 2016/0122114 A1* | 5/2016 | Junique | B65D 81/38 |
| | | | 83/32 |
| 2016/0236789 A1* | 8/2016 | Burns | B64C 39/024 |
| 2016/0286925 A1* | 10/2016 | Fuller | A44B 19/301 |
| 2017/0001724 A1* | 1/2017 | Yates | B64C 39/024 |
| 2018/0141698 A1* | 5/2018 | Barlas | B65D 37/00 |
| 2018/0244432 A1* | 8/2018 | Seiders | B65D 1/42 |
| 2018/0290814 A1* | 10/2018 | Smith | B65D 45/00 |
| 2020/0165007 A1* | 5/2020 | Augugliaro | B64F 1/16 |
| 2020/0165055 A1* | 5/2020 | Barfoot | B65D 43/164 |
| 2020/0172241 A1* | 6/2020 | Green | B64C 39/024 |
| 2020/0172244 A1* | 6/2020 | Green | B64D 1/22 |
| 2020/0393231 A1* | 12/2020 | Yen | F42B 39/14 |
| 2021/0030185 A1* | 2/2021 | Rogers | G06Q 10/083 |
| 2021/0156147 A1* | 5/2021 | Fermanian | E04B 2/18 |
| 2021/0171248 A1* | 6/2021 | Hawes | B65D 81/3869 |
| 2021/0380241 A1* | 12/2021 | Dichter | B64D 1/22 |
| 2022/0063805 A1* | 3/2022 | Coe | B64D 17/34 |
| 2022/0110424 A1* | 4/2022 | Rodgers | A45C 13/04 |

\* cited by examiner

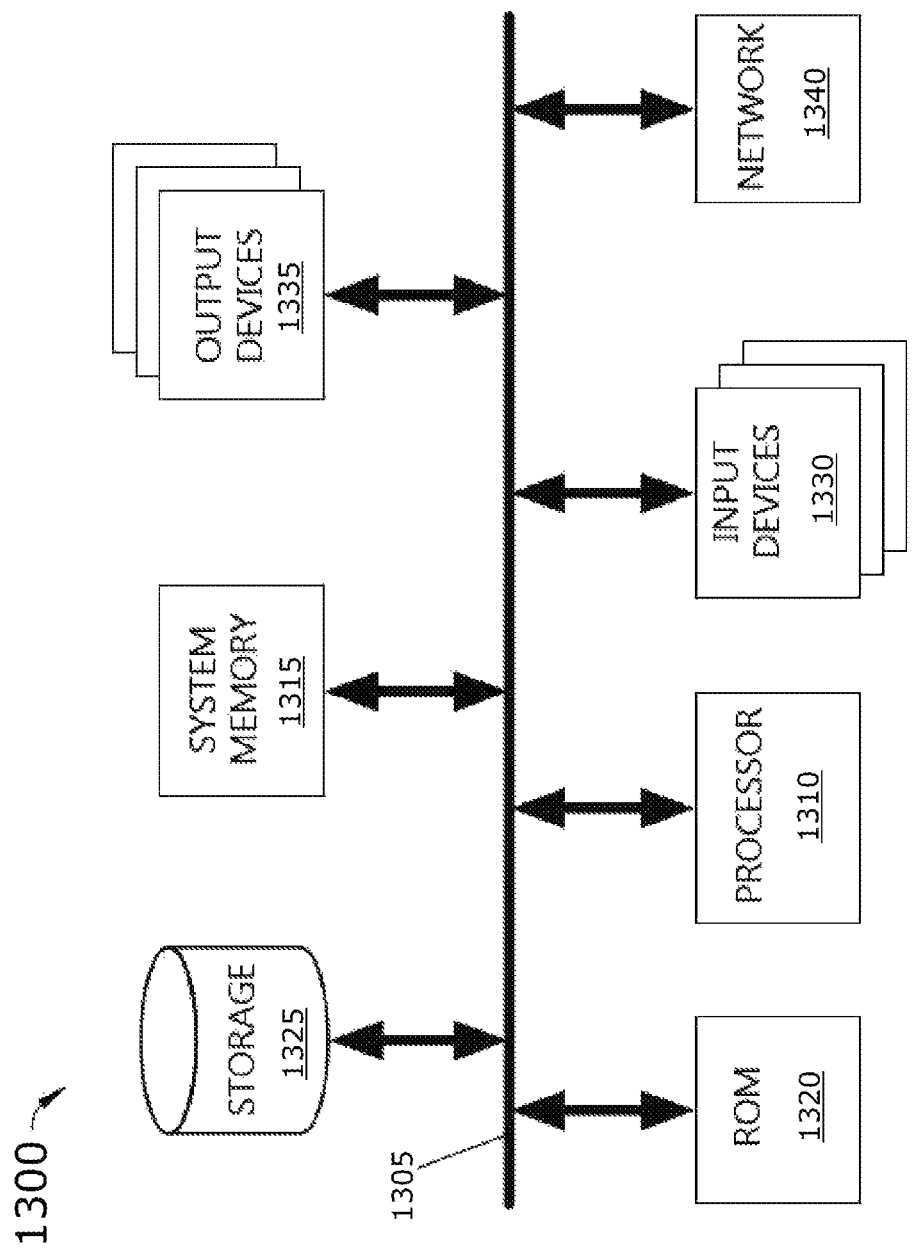

US 11,623,747 B1

AERIAL UTILITY METER READ SYSTEM AND A CUSTOM UTILITY METER READ EQUIPMENT CARRYING CASE CONFIGURED TO ATTACH TO AN AERIAL DRONE WHILE SECURELY CARRYING OPERABLE WIRELESS RADIO-BASED UTILITY METER READ EQUIPMENT USED TO CONDUCT AERIAL UTILITY METER READS

CLAIM OF BENEFIT TO PRIOR APPLICATION

This application claims benefit to U.S. Provisional Patent Application 63/185,251, entitled "AN AERIAL UTILITY READ SYSTEM FOR RADIO READ/PROXIMITY READ WATER METERS IN URBAN OR RURAL SITUATIONS," filed May 6, 2021. The U.S. Provisional Patent Application 63/185,251 is incorporated herein by reference.

BACKGROUND

Embodiments of the invention described in this specification relate generally to utility meter and device read systems, methods, and mechanisms in urban or rural locations, and more particularly, to an aerial utility meter read system and a custom utility meter read equipment carrying case configured to attach to a drone while securely carrying operable wireless radio-based utility meter read equipment used to conduct aerial utility meter reads.

Reading utility meters is typically done by foot or very slow moving, combustion-powered motor vehicles. This is slow and sometimes results in no reading because of inaccessible meters. This also requires human involvement (or man power). This is a problem which existing systems have not solved in the utility meter reading systems or mechanisms presently in use.

Some utility meters are read when human pilots fly from above meters and proceed on a meter-by-meter manner. However, human piloting requires constant attention and unbroken concentration. This also increases the man power requirements.

Beyond the conventional utility meter read practices, such as human personnel walking door to door in the hopes of obtaining visual access to a meter, systems that rely on slow moving combustion-power vehicles, and human piloted fly-over meter readings, there are no other devices or systems that are employed for current utility meter reading.

Therefore, what is needed is a way to make the process of reading utility and other meters and devices accessible, efficient, and accurate in a way that is faster than conventional utility meter read practices and which reduces manpower requirements and pollution footprint.

BRIEF DESCRIPTION

A novel aerial utility meter read system and a custom utility meter read equipment carrying case are disclosed. In some embodiments, the custom utility meter read equipment carrying case is configured to attach to a drone while securely carrying operable wireless radio-based utility meter read equipment used to conduct aerial utility meter reads. In some embodiments, the aerial utility meter read system eliminates the need to use combustion-powered slow moving vehicles by utilization of electric powered aerial drones to which the custom utility meter read equipment carrying case attaches with the requisite wireless radio-based utility meter read equipment needed to conduct aerial utility meter reads secured within interior space of the carrying case. In some embodiments, the aerial drones are battery powered drones that draw electric energy from onboard batteries.

In some embodiments, the aerial utility meter read system utilizes the operable wireless radio-based utility meter read equipment securely carried in the custom utility meter read equipment carrying case while attached to an aerial drone to perform aerial and wireless reading by radio (RF) or proximity reading of utility meters in urban or rural locations. In this way, the aerial utility meter read system and the custom utility meter read equipment carrying case allows one operator to read utility meters in a fraction of the usual time and allows access via aerial overflight for normally inaccessible meter reads.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 13 conceptually illustrates an electronic system with which some embodiments of the invention are implemented.

DETAILED DESCRIPTION

Figure 1:
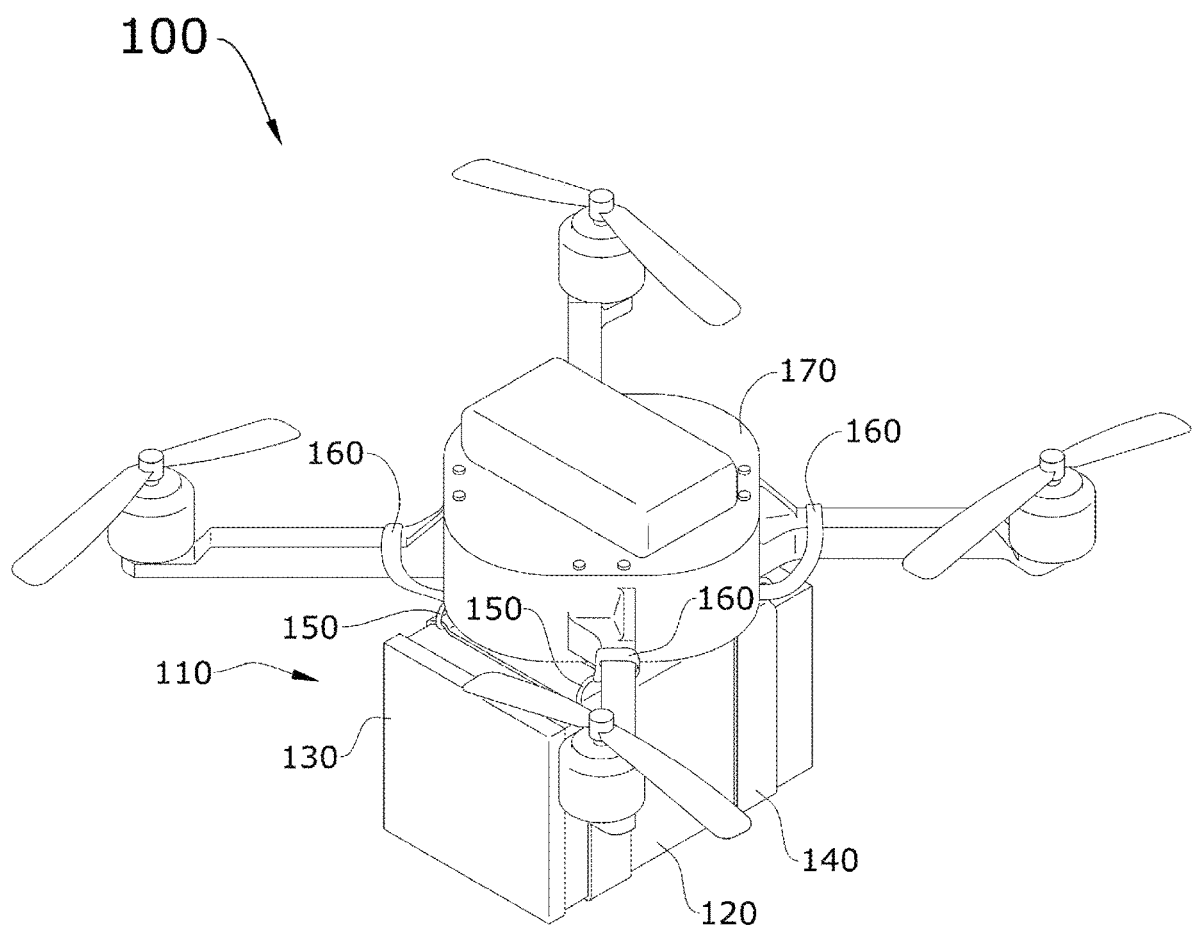
FIG. 1 conceptually illustrates a perspective view of an aerial utility meter read system ready for operation with a custom utility meter read equipment carrying case attached to an aerial drone used to conduct aerial utility meter reads in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel aerial utility meter read system and a custom utility meter read equipment carrying case configured to attach to a drone while securely carrying operable wireless radio-based utility meter read equipment used to conduct aerial utility meter reads. In some embodiments, the aerial utility meter read system eliminates the need to use combustion-powered slow moving vehicles by utilization of electric powered aerial drones to which the custom utility meter read equipment carrying case attaches with the requisite wireless radio-based utility meter read equipment needed to conduct aerial utility meter reads secured within interior space of the carrying case. In some embodiments, the aerial drones are battery powered drones that draw electric energy from onboard batteries.

In some embodiments, the aerial utility meter read system utilizes the operable wireless radio-based utility meter read equipment securely carried in the custom utility meter read equipment carrying case while attached to an aerial drone to perform aerial and wireless reading by radio (RF) or proximity reading of utility meters in urban or rural locations. In this way, the aerial utility meter read system and the custom utility meter read equipment carrying case allows one operator to read utility meters in a fraction of the usual time and allows access via aerial overflight for normally inaccessible meter reads.

As stated above, reading utility meters is typically done by foot or very slow moving, combustion-powered motor vehicles. This is slow and sometimes results in no reading because of inaccessible meters. This is a problem which existing systems have not solved in the utility meter reading systems or mechanisms presently in use. Some utility meters are read when pilots fly from above meters and proceed on a meter-by-meter manner. However, human piloting requires constant attention and unbroken concentration. Beyond the conventional utility meter read practices, such as human personnel walking door to door in the hopes of obtaining visual access to a meter, systems that rely on slow moving combustion-power vehicles, and human piloted fly-over meter readings, there are no other devices or systems that are employed for current utility meter reading. Embodiments of the aerial utility meter read system and the custom utility meter read equipment carrying case configured to attach to a drone while securely carrying operable wireless radio-based utility meter read equipment used to conduct aerial utility meter reads described in this specification solve such problems by a custom built carrying case that allows electronic equipment, wireless equipment (including Bluetooth, cellular, and other wireless equipment), and other equipment to be carried by a drone securely whether in an operational state, standby state, or non-operational state. By attaching the custom utility meter read equipment carrying case to a drone, the aerial utility meter read system is able to monitor/read utility meters, utility devices, and other meters and devices.

Embodiments of the aerial utility meter read system and the custom utility meter read equipment carrying case configured to attach to a drone while securely carrying operable wireless radio-based utility meter read equipment used to conduct aerial utility meter reads described in this specification differ from and improve upon currently existing options. In particular, there is currently nothing in this field being used to do radio reads of utility or other devices in urban, rural, and many otherwise inaccessible locations. The only thing close is human read meters either by walking or slow moving vehicle. The traditional manner involves the slow moving vehicle, but is slow and prone to failure—specifically, when a utility meter is behind a wall, fence, or other inaccessible blockage. By contrast, the aerial utility meter read system and the custom utility meter read equipment carrying case of the present disclosure reduces the time needed to do utility meter reads in a traditional manner (driving around in a car/truck) by an average reduction in time of seventy-five percent (75%). Thus, what traditionally would take sixteen hours (16 hrs) can be completed in four hour (4 hrs) in many instances.

In addition, driving around in a motor vehicle creates pollution by burning fossil fuels. This traditional manner of taking utility meter readings takes a long time, since vehicle speeds of only 3-5 mph are suggested to overcome interference and lag times. Also, an elevated risk of motor vehicle accidents arises when the traditional manner of meter reads is performed due to the very low speeds of the vehicle (which other vehicles may not anticipate, or simply throws them off) and also causes driver fatigue. However, embodiments of the aerial utility meter read system and the custom utility meter read equipment carrying case improve upon this traditional manner of taking utility meter readings by using electric/battery powered drones that do no burn fossil fuels and, therefore, do not emit harmful emissions into the air. Also, since the meter read hardware is secured inside the custom utility meter read equipment carrying case and that carrying case itself is attached an aerial drone, the human attention needs are dramatically reduced from systems in which a human pilot operates/flies an aerial vehicle, such as a helicopter or plane.

In some embodiments, the aerial utility meter read system and the custom utility meter read equipment carrying case configured to attach to a drone while securely carrying operable wireless radio-based utility meter read equipment used to conduct aerial utility meter reads work together when a carrying case is attached to an aerial drone to carry equipment that is configured to wirelessly read utility meters (such as water meters). In some embodiments, the custom utility meter read equipment carrying case is custom-built, unique, lightweight, and constructed with materials the prevent malfunction of the hardware equipment packed into the carrying case and used during flight to read meters. The custom utility meter read equipment carrying case (also referred to as the "carrier case", the "carrying case", or just the "case") is designed to carry commonly used meter interrogators and command link communicators. In some embodiments, the equipment includes one or more of the Sensus FL6502 and the CommandLink CL100 modules, readers, and/or systems. In some embodiments, operation of the aerial utility meter read system and the custom utility meter read equipment carrying case allows reliable operations and automated waypoint travel, return, and landing. In some embodiments, the aerial utility meter read system and the custom utility meter read equipment carrying case comprises a unique combination of custom firmware along with software systems, all of which are combined in connection with the carrier case. The aerial utility meter read system and custom utility meter read equipment carrying case is configured to be used with any of several drone platforms that have certain payload capabilities (that is, different weight and size dimensions), software, and hardware. The payload carried by the aerial utility meter read system and custom utility meter read equipment carrying case includes one or more meter interrogators (e.g., Sensus FL6502 readers) and command link communicators (e.g., the CommandLink CL100 system module or similary sized/weighted product).

In some embodiments, the aerial utility meter read system and custom utility meter read equipment carrying case establishes a method for collecting data. In some embodiments, the aerial utility meter read system and custom utility meter read equipment carrying case collects data in the form of utility meter readings using a drone via waypoints that are plotted or programmed in a flight route or flight map. In some embodiments, the aerial drone utilized by the aerial utility meter read system and custom utility meter read equipment carrying case is a drone that is capable of supporting a minimum payload of at least two kilograms, including the custom utility meter read equipment carrying case, hardware equipment for reading meters, accessories, and an electric power source (a single battery or a plurality of onboard batteries). In some embodiments, the aerial drone is a non-surveillance drone. A non-surveillance drone is typically not configured for recording video or capturing still images, but is useful for the purposes and objectives of the aerial utility meter read system and the custom utility meter read equipment carrying case of the present disclosure. In a preferred embodiment, the aerial drone comprises a DJI N1 model drone with supported GPS and power modules, common to the Matrice 100 or similar model. Thus, the airframe used for demonstration is the DJI Matrice 100 Enterprise Drone, which has a take off capacity 3.6 kg and includes propellers, motors, and speed controllers capable of lithium polymer batteries. In some embodiments, a ground station would be deployed for use. In some embodiments, the ground station would be communicably connected to a computing device, such as a portable tablet computing device, a notebook computer with a cellular connection, which may be embedded or attached via dongle and the software to setup and control the drone. The ground station is responsible for mission planning for autonomous flight, flight map display, and waypoint navigation, as well as setup and programming of the flight controller. Sensors (onboard, embedded, or otherwise attached) would include any sensors needed to capture, read, or otherwise obtain the meter readings/data, or other external data, such as obstacles, distance, and/or optical flow. In some embodiments, sensors are optional add-ons for the aerial utility meter read system and carrying case to wirelessly read water meters by drone. However, such sensors assist in keeping the drone away from harm. Also, a controller (i.e., a transmitter and a receiver, or combination transceiver device) may be used for manual control of the drone.

Embodiments of the aerial utility meter read system and the custom utility meter read equipment carrying case described in this specification differ from and improve upon currently existing options. In particular, some embodiments of the aerial utility meter read system and the custom utility meter read equipment carrying case improve upon the currently existing options since there are no existing aerial drone utility meter reader systems like the aerial utility meter read system and custom utility meter read equipment carrying case of the present disclosure. Not only are there no existing aerial drones or similar systems in the commercial market, there are no drones or similar aerial utility meter read systems in use in the USA. The aerial utility meter read system and custom utility meter read equipment carrying case improves on standard walk-through mechanisms or aerial drones without such utility meter reader equipment/devices by allowing a single operator to read water or other utility meters in a fraction of the typical time involved in taking meter readings and without the risk of animal encounters or access problems normally associated with this activity.

The aerial utility meter read system and the custom utility meter read equipment carrying case configured to attach to a drone while securely carrying operable wireless radio-based utility meter read equipment used to conduct aerial utility meter reads of the present disclosure may be comprised of the following elements. This list of possible constituent elements is intended to be exemplary only and it is not intended that this list be used to limit the aerial utility meter read system and the custom utility meter read equipment carrying case of the present application to just these elements. Persons having ordinary skill in the art relevant to the present disclosure may understand there to be equivalent elements that may be substituted within the present disclosure without changing the essential function or operation of the aerial utility meter read system and the custom utility meter read equipment carrying case.

1. A carrying case.
2. Waterproof poly fabric.
3. High Density ¼" foam padding.
4. Non-metallic stiffener plate 10"×6" (Top).
5. Non-metallic stiffener plate with a plurality of holes in a rectangular pattern. In some embodiments, twenty-one holes in a rectangular pattern, each hole having a diameter of exactly or approximately half an inch (0.5").
6. A plurality of non-metallic hangers sewn into nylon straps surrounding the carrying case. In some embodiments, four non-metallic hangers sewn in to 32 mm nylon straps surrounding the carrying case.
7. A foam base to hold command link hardware securely. In some embodiments, the foam base is exactly or approximately two and a half inches (2.5") in height.
8. Hook and loop access panel on front of carrying case
9. Hook and loop cinch straps for drone mount. In some embodiments, the hook and loop cinch straps are 8"×0.5". In some embodiments, the hook and loop cinch straps have a tensile strength of twenty-nine pounds (29# tensile strength).
10. Universal mount plate kit for applications where the hook and loop cinch straps would not work.
11. Faraday fabric lining inner top and side panels of the carrying case to shield electromagnetic fields (EMF) and electromagnetic interference (EMI) signals.

The aerial utility meter read system and the custom utility meter read equipment carrying case configured to attach to a drone while securely carrying operable wireless radio-based utility meter read equipment used to conduct aerial utility meter reads of the present disclosure generally works by attachment of a non-interference case, that is very lightweight and waterproof, to an aerial drone. Non-metallic components and ported base plate allow for utility radio reads without scattering the signals. The case is designed specifically to carry the most popular remote reader and others using any of several aerial drone platforms. The aerial utility meter read system is designed to work with common utility or delivery drones using a prepared software component list. Together this allows a trained single utility operator to read a neighborhood meter list in up to 80% less time. Also, the carrying case—when combined with an aerial drone, allows access to remote or inaccessible meters via aerial flyover.

To make the aerial utility meter read system and the custom utility meter read equipment carrying case configured to attach to a drone while securely carrying operable wireless radio-based utility meter read equipment used to conduct aerial utility meter reads of the present disclosure, the carrying case itself would be made by an upholsterer using the materials described above and configured as shown in the figures. The universal custom mount would be made by a machine shop and welder according to the specific needs for a specific application. The case comes with a universal mounting kit. Although, in some embodiments of the aerial utility meter read system and custom utility meter read equipment carrying case, the mounting system may need changes to adapt to particulars of the drone or anticipated load weight, etc. While the custom utility meter read equipment carrying case itself is designing to be universally mounted, there are so many heavy lifting drones, that some may need to use the custom mount system (aluminum), while others can attach via hooks/hangers and cinch straps (such as hook and loop cinch straps). In some embodiments, the carrying case could be mounted in other ways, such as a double loaded system in which a maximum payload would allow for the carrying case and other box or case to be attached for other functions (e.g., land or road survey imaging equipment, surveillance equipment, etc.). In some embodiments, the custom utility meter read equipment carrying case itself could be reconfigured with different foam padding used internally to secure the interrogator and command link components. In some embodiments, the custom utility meter read equipment carrying case could also be configured with different fabrics, or different panels. In some embodiments, the custom utility meter read equipment carrying case employs a fully opening front access panel flap that is secured in a closed configuration by hook and loop fasteners to the side and top panels of the carrying case. In some embodiments, the front access panel is bifurcated so that a top half flap, which is secured to the top and side panels by hook and loop fasteners, opens when pulled open and a bottom half of the front panel is rigid and does not open.

To use the aerial utility meter read system and the custom utility meter read equipment carrying case configured to attach to a drone while securely carrying operable wireless radio-based utility meter read equipment used to conduct aerial utility meter reads of the present disclosure, a person qualified to fly a commercial drone would attach the custom utility meter read equipment carrying case to the drone, insert wireless and meter reading hardware devices and equipment, enter a flight route, and follow the flight route during operation of the drone by the person, reading and collecting the meter values along the route. In some embodiments, the aerial utility meter read system is configured to operate with aerial drones of at least four motors. In this way, a person could obtain a drone with a typical configuration of four, six, or eight motors (or more), and follow instructions to attach the custom utility meter read equipment carrying case to the drone, insert interrogator/command link/or other reading devices, enter the flight route, and then operate the drone to fly the route and complete collection of read information/values.

By way of example, FIG. 1 conceptually illustrates a perspective view of an aerial utility meter read system 100 ready for operation with a custom utility meter read equipment carrying case 110 attached to an aerial drone 170 used to conduct aerial utility meter reads in some embodiments. As shown in this figure, the aerial utility meter read system 100 includes the custom utility meter read equipment carrying case 110 which is attached to the aerial drone 170. The custom utility meter read equipment carrying case 110 is composed of a carrying case housing 120, a front access panel flap 130, a plurality of carrying case straps 140, a plurality of strap hangers 150, and a plurality of hook and loop cinch straps 160. The plurality of hook and loop cinch straps 160 are wound around the arms of the aerial drone 170. The front access panel flap 130 is opened to insert the utility meter reading hardware equipment into the carrying case housing 120. Each of the carrying case straps 140 surrounds the carrying case housing 120. The strap hangers 150 connect the custom utility meter read equipment carrying case 110 to the aerial drone 170 by connecting underneath the carrying case straps 140 with the hook and loop cinch straps 160 connecting the strap hangers 150 to the arms of the aerial drone 170. A more detailed view of a custom utility meter read equipment carrying case is demonstrated next, by reference to FIG. 2.

Figure 2:
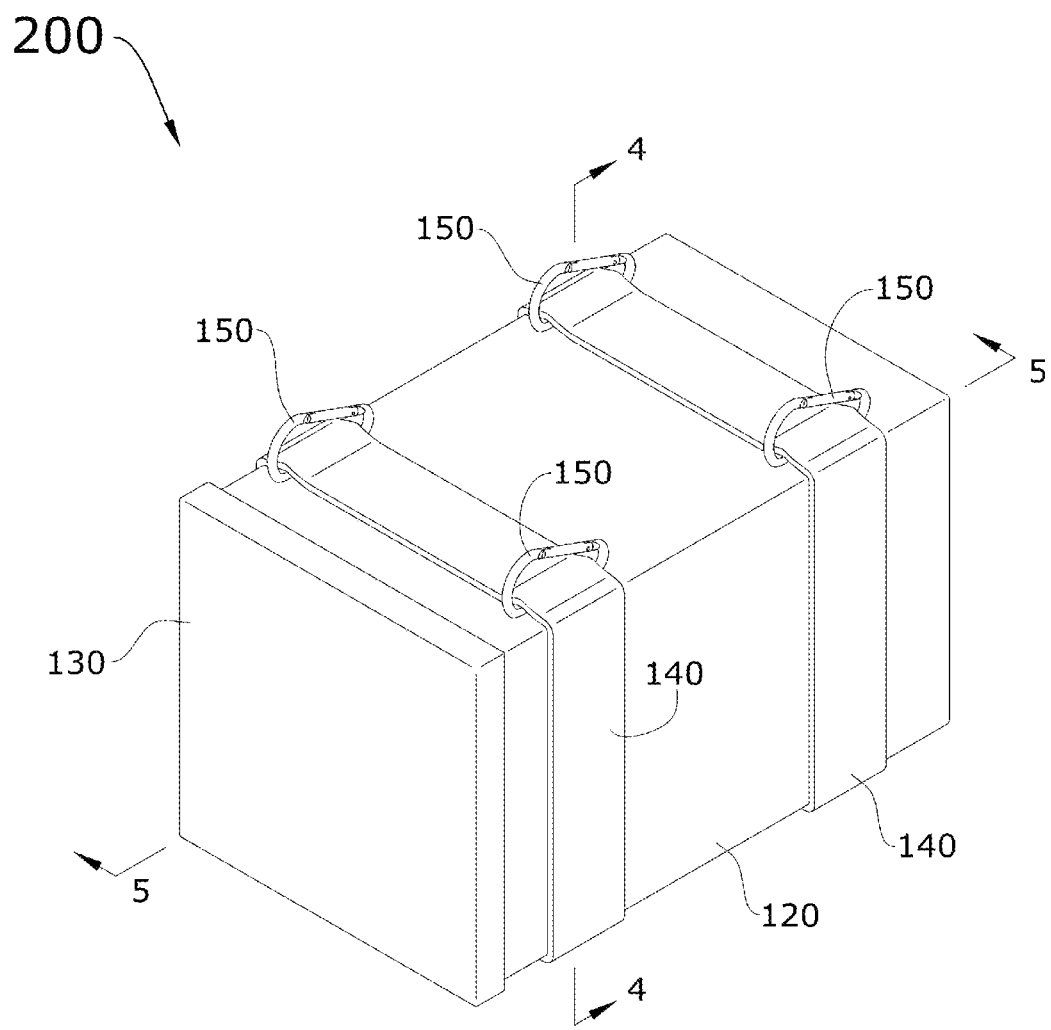
FIG. 2 conceptually illustrates a perspective view of a custom utility meter read equipment carrying case in some embodiments.

Specifically, FIG. 2 conceptually illustrates a perspective view of a custom utility meter read equipment carrying case 200. As shown in this figure, the custom utility meter read equipment carrying case 200 includes the carrying case housing 120, the front access panel flap 130, the plurality of carrying case straps 140, and the plurality of strap hangers 150. Also, perspective lines along 4-4 and 5-5 are shown in this figure, which relate to different section views of the custom utility meter read equipment carrying case, which are described below, by reference to FIGS. 4 and 5, respectively.

Figure 3:
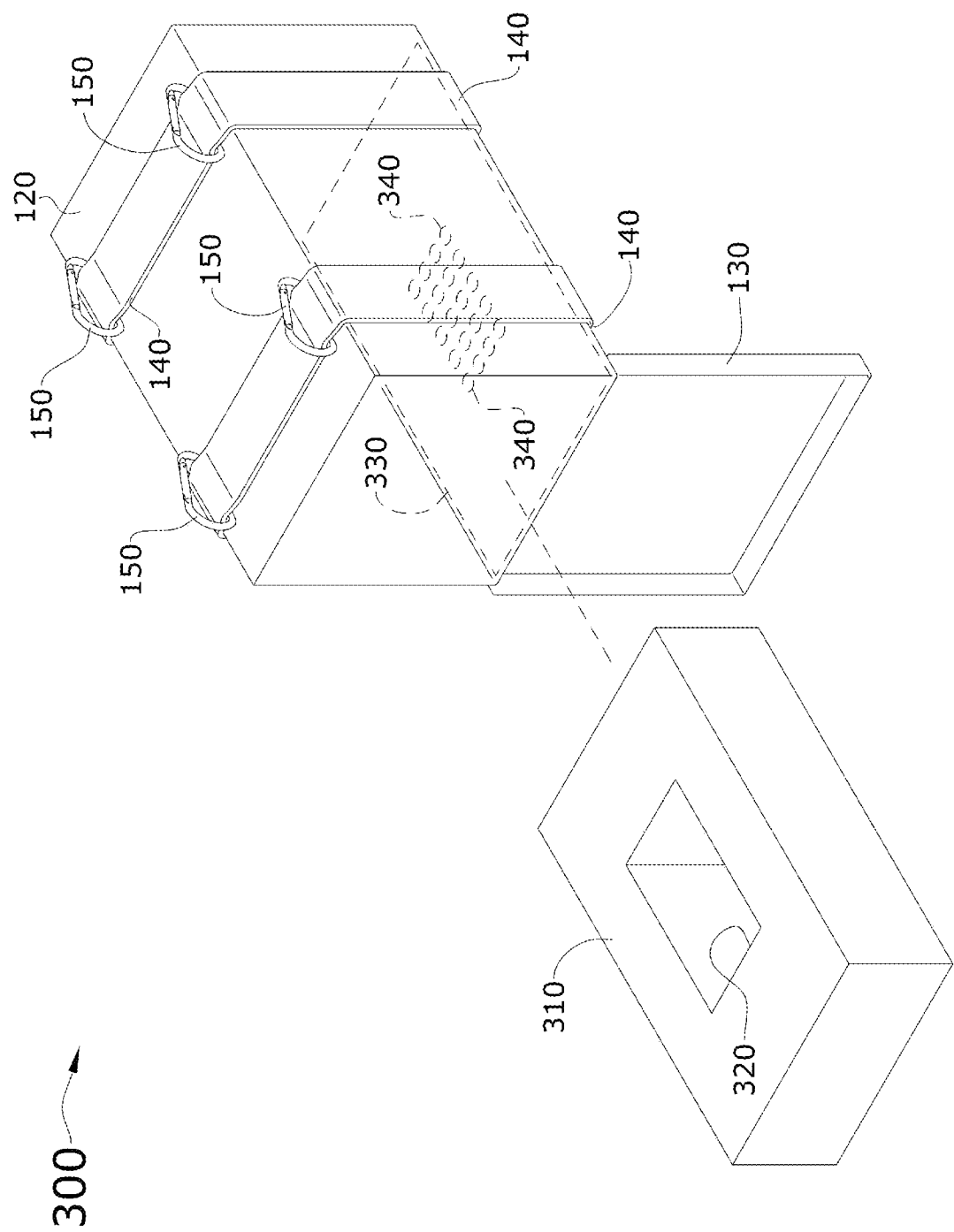
FIG. 3 conceptually illustrates an exploded view of the custom utility meter read equipment carrying case in some embodiments.

Turning to another example, FIG. 3 conceptually illustrates an exploded view of a custom utility meter read equipment carrying case 300 in some embodiments. As shown in this figure, the exploded view of the custom utility meter read equipment carrying case 300 demonstrates components such as the carrying case housing 120, the front access panel flap 130, the plurality of carrying case straps 140, and the plurality of strap hangers 150. The exploded view of the custom utility meter read equipment carrying case 300 also shows a foam block 310, a foam block cavity 320 (as a cut out from the foam block 310), a bottom plate 330, and a plurality of bottom plate holes 340. The foam block 310 is configured to fit within the carrying case housing 120 above the bottom plate 330. The foam block cavity 320 aligns with the plurality of bottom plate holes 340 so that an interrogator device, command link device, or other reading device (reading hardware) can direct radio (RF) signals toward the utility meters being read while the aerial drone is being piloted over the flight route. The foam block cavity 320 thereby secures the reading hardware in position for optimal utility meter reading. Other hardware/devices may also be inserted into the carrying case housing 120 to rest on the foam block 310. In this way, when the front access panel flap 130 is closed (and secured by the hook and loop fasteners along the outer edges of the top panel and side panels), all of the utility meter read equipment for the aerial utility meter read system is secured in place regardless of aerial drone velocity, orientation, or other flight aberrations such as debris that may collide or turbulence/shaking that may occur during flight.

Figure 4:
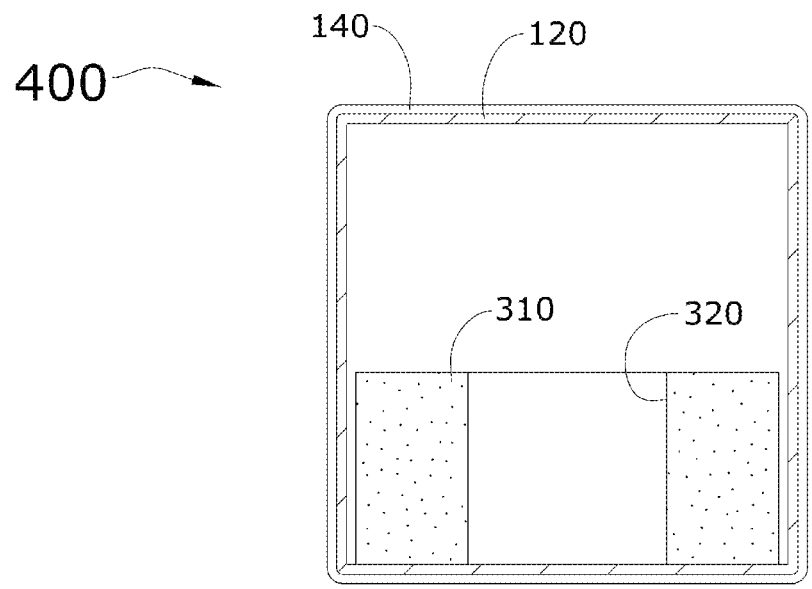
FIG. 4 conceptually illustrates a section view of the custom utility meter read equipment carrying case taken along 4-4 in FIG. 2.

Turning to FIG. 4, a section view of the custom utility meter read equipment carrying case 400 is shown. The section view of the custom utility meter read equipment carrying case 400 is the perspective taken along 4-4 in FIG. 2. This figure demonstrates a section view of the carrying case housing 120 and a carrying case strap 140, as well as section view of the foam block 310 and foam block cavity 320 inside the carrying case housing 120.

Figure 5:
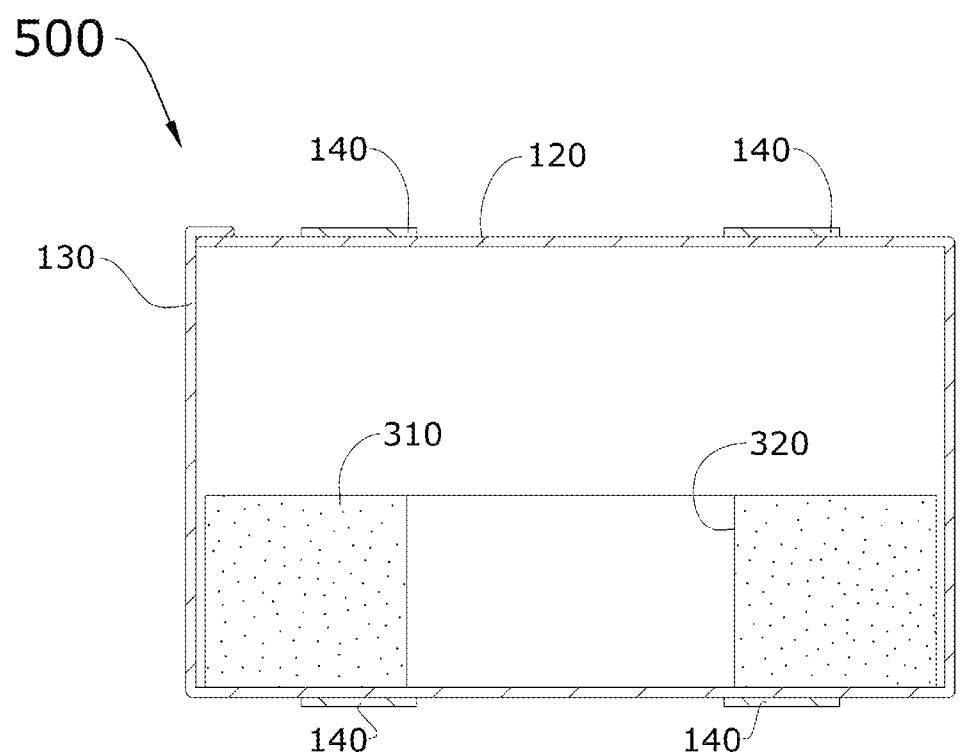
FIG. 5 conceptually illustrates a section view of the custom utility meter read equipment carrying case taken along 5-5 in FIG. 2.

Now turning to another section view example, FIG. 5 conceptually illustrates a section view of the custom utility meter read equipment carrying case 500 from the perspective taken along 5-5 in FIG. 2. In this figure, the elongated side perspective view is shown with the carrying case housing 120, the front access panel flap 130 (in its fully-closed configuration), and the plurality of carrying case straps 140 (top and bottom), in addition to the internal components of the foam block 310 and foam block cavity 320.

Figure 6:
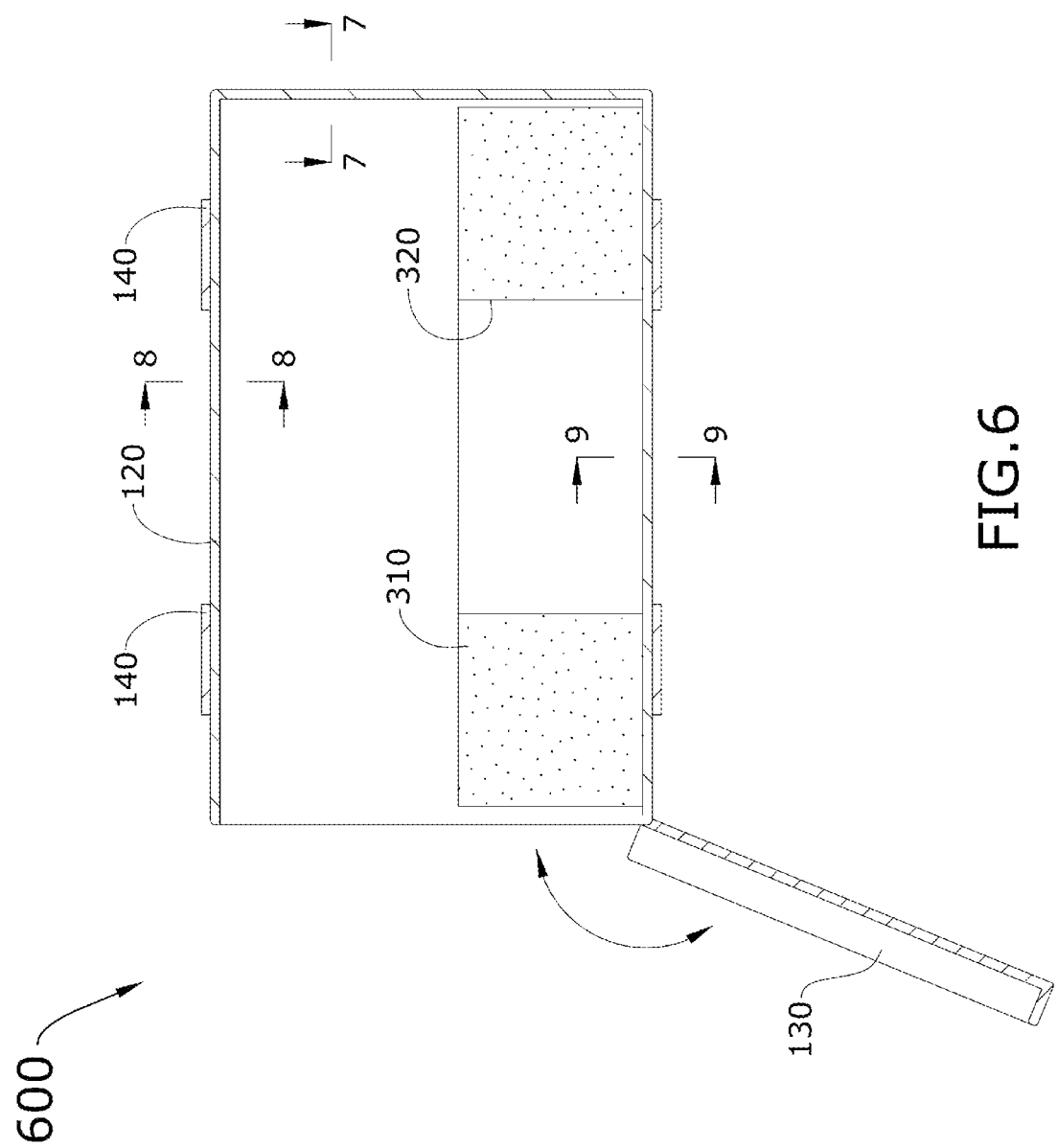
FIG. 6 conceptually illustrates a section view of the custom utility meter read equipment carrying case showing motion of the access flap in some embodiments.

In yet another section view example, FIG. 6 conceptually illustrates a section view of the custom utility meter read equipment carrying case 600 showing motion of the front access panel flap 130 to open into its fully-open configuration, thereby providing a person access to the interior section of the carrying case housing 120 for inserting or removing equipment/hardware utilized for the meter readings during flight of the aerial drone. In addition to showing the carrying case housing 120, the front access panel flap 130 (in its fully-opened configuration), the plurality of carrying case straps 140 (top and bottom), and the internal components of the foam block 310 and foam block cavity 320, the section view of the custom utility meter read equipment carrying case 600 also shows perspective lines along 7-7, 8-8, and 9-9, which relate to different section views of the (back) side panel, the top side panel, and the bottom side panel, respectively, of the carrying case housing 120, and which are described below, by reference to FIGS. 7, 8, and 9.

Figure 7:
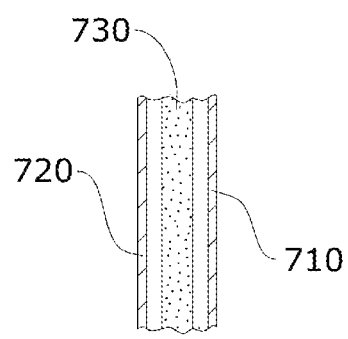
FIG. 7 conceptually illustrates a detailed section view of a side panel of the custom utility meter read equipment carrying case, taken along 7-7 in FIG. 6.

By way of example, FIG. 7 conceptually illustrates a detailed section view of a side panel of the custom utility meter read equipment carrying case, taken along 7-7 in FIG. 6. As shown, the side panel includes an exterior waterproof fabric 710, an interior Faraday fabric 720, and an internal high-density foam 730. The Faraday fabric 720 is lined along the interior of the side panel to shield the equipment/hardware devices inserted into the custom utility meter read equipment carrying case from exterior EMF and EMI signals that may cause disruption or malfunction of the meter reading equipment/hardware.

Figure 8:
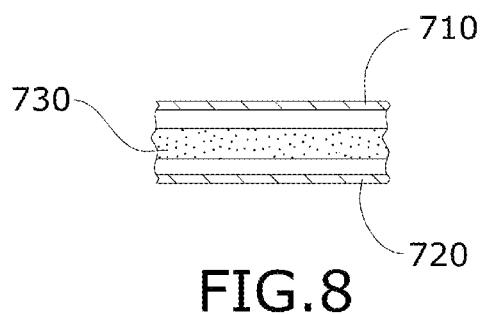
FIG. 8 conceptually illustrates a detailed section view of the top panel of the custom utility meter read equipment carrying case, taken along 8-8 in FIG. 6.

Now turning to another section view, FIG. 8 conceptually illustrates a detailed section view of the top panel of the custom utility meter read equipment carrying case, taken along 8-8 in FIG. 6. As shown, the top panel of the custom utility meter read equipment carrying case is constructed of the exterior waterproof fabric 710, the interior Faraday fabric 720, and the internal high-density foam 730. As this top panel section view demonstrates, the Faraday fabric 720 is lined along the interior of the top panel in order to shield the equipment/hardware devices inserted into the custom utility meter read equipment carrying case from exterior EMF and EMI signals that may cause disruption or malfunction of the meter reading equipment/hardware.

Figure 9:
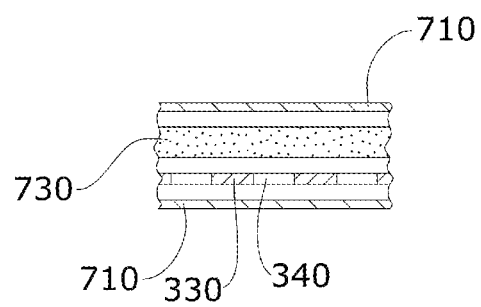
FIG. 9 conceptually illustrates a detailed section view of the bottom panel of the custom utility meter read equipment carrying case, taken along 9-9 in FIG. 6.

Now referring to yet another section view, FIG. 9 conceptually illustrates a detailed section view of the bottom panel of the custom utility meter read equipment carrying case, taken along 9-9 in FIG. 6. As shown in this figure, construction of the bottom panel of the custom utility meter read equipment carrying case includes the waterproof fabric 710 (exterior and interior lining), the internal high-density foam 730, and the bottom plate 330 with the plurality of bottom plate holes 340. In this case, the bottom panel needs to allow for EMF signals through the plurality of bottom plate holes 340, so there is no Faraday fabric 720 lining which might act to block signaling.

Figure 10:
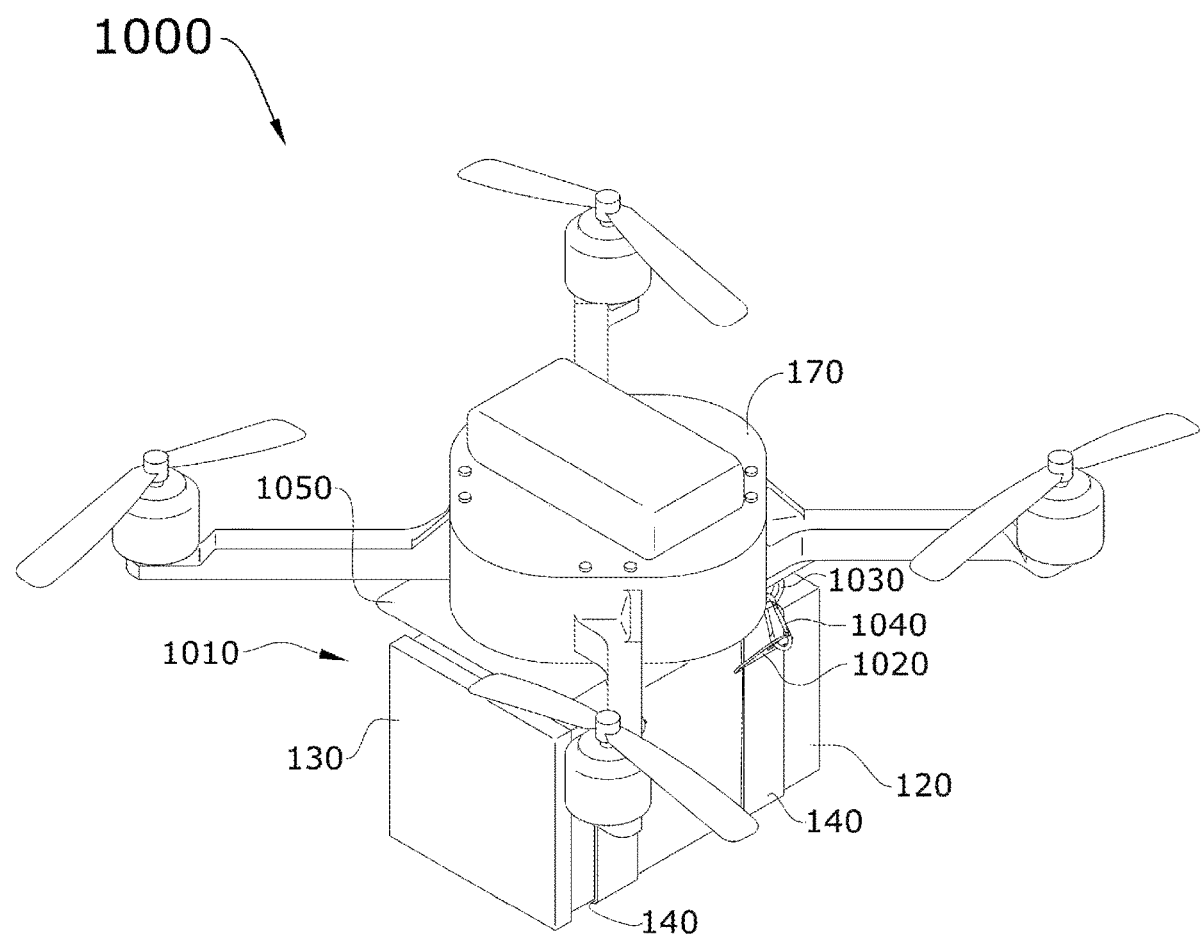
FIG. 10 conceptually illustrates a perspective view of an alternate embodiment of the aerial utility meter read system with the custom utility meter read equipment carrying case attached to an aerial drone.

Turning to another example, FIG. 10 conceptually illustrates a perspective view of an alternate embodiment of the aerial utility meter read system 1000 with the custom utility meter read equipment carrying case 1010 attached to an aerial drone 170. As shown in this figure, the aerial utility meter read system 1000 includes the custom utility meter read equipment carrying case 1010 which is attached to the aerial drone 170. The custom utility meter read equipment carrying case 1010 is composed of the carrying case housing 120, the front access panel flap 130, the plurality of carrying case straps 140, a mini clip 1020, an attachment ring 1030, an alternate clip 1040, and a permanent mount plate 1050. The mini clip 1020, the attachment ring 1030, and the alternate clip 1040 are shown in this figure as singular items. However, even though not illustrated in this figure, in actual deployments of the aerial utility meter read system 1000, there are a plurality of mini clips 1020, a plurality of attachment rings 1030, and/or a plurality of alternate clips 1040. Note that the plurality of alternate clips 1040 in some embodiments are approximately the same components as the plurality of strap hangers 150, but may differ in size, weight, strength, etc. Detailed views of a custom utility meter read equipment carrying case that attaches to the permanent mount plate 1050 of an aerial drone by way of the plurality of mini clips 1020 and the plurality of attachment rings 1030 are described further below, by reference to FIGS. 11-12.

Figure 11:
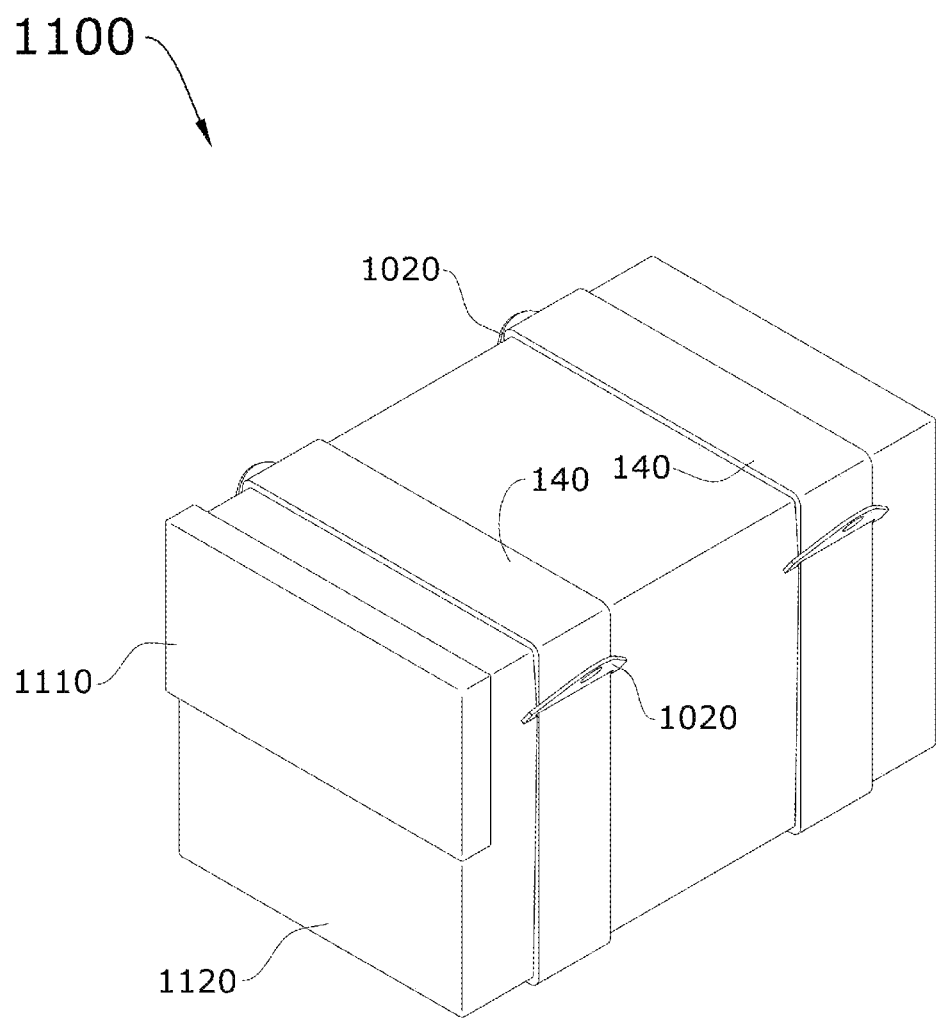
FIG. 11 conceptually illustrates a perspective view of an alternate embodiment of the custom utility meter read equipment carrying case.

Specifically, FIG. 11 conceptually illustrates a perspective view of an alternate embodiment of the custom utility meter read equipment carrying case 1100 (herein after referred to as the "partial access panel utility meter read equipment carrying case 1100"). In particular, the partial access panel utility meter read equipment carrying case 1100 shown in this figure includes a front access panel that is bifurcated with a top half access flap 1110 and a bottom half rigid front panel that is integrated with the overall carrying case housing 1120, along with the plurality of carrying case straps 140 and the plurality of mini clips 1020. In some embodiments, the top half access flap 1110 is secured to the top and side panels of the carrying case housing 1120 by hook and loop fasteners that align along the edges so that the top half access flap 1110 opens when pulled open and secures closed when closed. The bottom half of the front access panel is rigid and integrated with the overall carrying case housing 1120 and, therefore, does not open.

Figure 12:
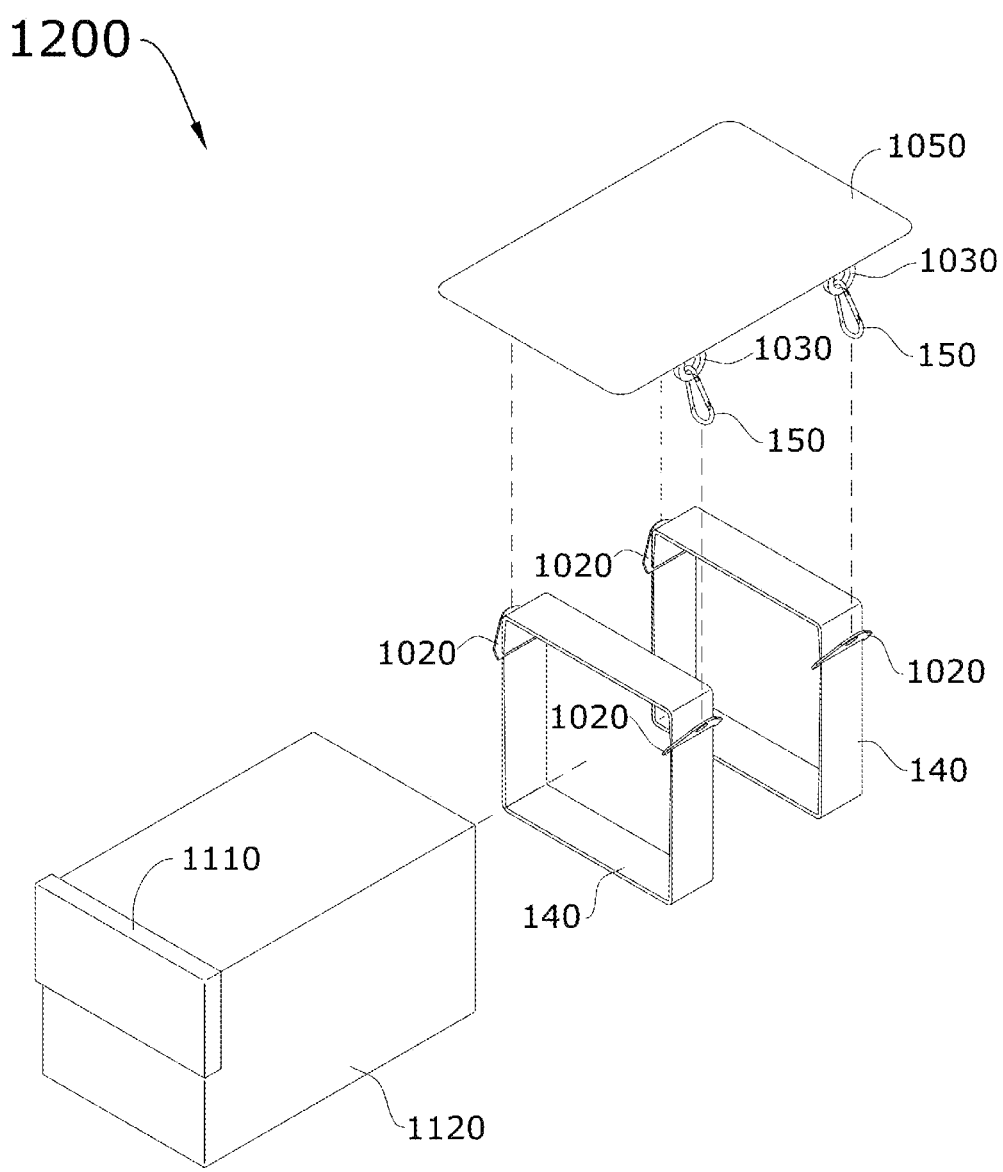
FIG. 12 conceptually illustrates an exploded view of an attachment plate used in some embodiments to attach the alternate embodiment of the custom utility meter read equipment carrying case to the aerial drone.

By way of example, FIG. 12 conceptually illustrates an exploded view 1200 of an attachment plate 1050 (hereinafter also referred to as the "universal mount plate 1050" or the "permanent mount plate 1050") used in some embodiments to attach the partial access panel utility meter read equipment carrying case 1100 to an aerial drone. As shown in this exploded view 1200, each of the plurality of carrying case straps 140 include two mini clips 1020. The plurality of carrying case straps 140 surround the carrying case housing 1120 with the top half access flap 1110 when in typical construction. The mini clips 1020 are positioned along the carrying case straps 140 to be disposed along either exterior side of the partial access panel utility meter read equipment carrying case 1100 and in a same vertical position as the plurality of attachment rings 1030 which are themselves attached to an underside of the permanent mount plate 1050 along with the strap hangers 150. Note that the plurality of strap hangers 150 and the plurality of alternate clips 1040 are approximately the same components, but may differ in size, weight, strength, etc.

Additionally, while the examples described above focus on utility meter reading by aerial drone operation, the custom utility meter read equipment carrying case can be adapted to carry a number of different types of electronic monitoring devices, equipment, hardware, or supplies as long as they fit the inside dimensions and weight limitations. Also, in this specification, the term "software" is meant to include firmware or embedded software modules residing in read-only memory or applications stored in magnetic storage, which can be read into memory for processing by a processor. In some embodiments, the software, when installed to operate on one or more electronic systems, define one or more specific machine implementations that execute and perform the operations of the software.

FIG. 13 conceptually illustrates an electronic system 1300 with which some embodiments of the invention are implemented. The electronic system 1300 may be a computer, mobile device (cell phone, mobile phone, smartphone, tablet computing device, etc.), embedded single board computer (SBC), embedded drone printed circuit board (PCB) and main control unit (MCU) or any other sort of electronic device or computing device. Such an electronic system includes various types of computer readable media and interfaces for various other types of computer readable media. Electronic system 1300 includes a bus 1305, processing unit(s) 1310, a system memory 1315, a read-only memory 1320, a permanent storage device 1325, input devices 1330, output devices 1335, and a network 1340.

The bus 1305 collectively represents all system, peripheral, and chipset buses that communicatively connect the numerous internal devices of the electronic system 1300. For instance, the bus 1305 communicatively connects the processing unit(s) 1310 with the read-only 1320, the system memory 1315, and the permanent storage device 1325. From these various memory units, the processing unit(s) 1310 retrieves instructions to execute and data to process in order to execute the flight route functions of reading the utility meters along the flight path. The processing unit(s) may be a single processor or a multi-core processor in different embodiments.

The read-only-memory (ROM) 1320 stores static data and instructions that are needed by the processing unit(s) 1310 and other modules of the electronic system. The permanent storage device 1325, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1325.

Other embodiments use a removable storage device (such as a floppy disk or a flash drive) as the permanent storage device 1325. Like the permanent storage device 1325, the system memory 1315 is a read-and-write memory device. However, unlike storage device 1325, the system memory 1315 is a volatile read-and-write memory, such as a random access memory. The system memory 1315 stores some of the instructions and data that the processor needs at runtime. In some embodiments, the invention's processes are stored in the system memory 1315, the permanent storage device 1325, and/or the read-only memory 1320. For example, the various memory units may include instructions that identify waypoints in a flight route programmed by a pilot of the aerial drone in accordance with some embodiments. From these various memory units, the processing unit(s) 1310 retrieves instructions to execute and data to process in order to execute the processes of some embodiments.

The bus 1305 also connects to the input and output devices 1330 and 1335. The input devices enable the user to communicate information and select commands to the electronic system. The input devices 1330 include alphanumeric keyboards and pointing devices (also called "cursor control devices"). The output devices 1335 display images generated by the electronic system 1300. The output devices 1335 include printers and display devices, such as liquid crystal displays (LCD) and organic light emitting diode (OLED) displays. Some embodiments include devices such as a touchscreen for both input and output functions.

Finally, as shown in FIG. 13, bus 1305 also couples electronic system 1300 to a network 1340 through a network adapter (not shown). In this manner, the computer can be a part of a network of computers (such as a local area network ("LAN"), a wide area network ("WAN"), or an intranet), or a network of networks (such as the Internet). Any or all components of electronic system 1300 may be used in conjunction with the invention.

These functions described above can be implemented in digital electronic circuitry, in computer software, firmware, or hardware. The techniques can be implemented using one or more computer program products. Programmable processors and computers can be packaged or included in mobile devices. The processes may be performed by one or more programmable processors and by one or more set of programmable logic circuitry. Computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, machine-readable storage media, etc.). Some examples of such computer-readable media include RAM, ROM, disc media (CDs, DVDs, Blu-Ray® discs, ultra density optical discs, etc.), flash memory (e.g., SD cards, mini-SD cards, micro-SD cards, etc.), magnetic and/or solid state hard drives, or any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. An aerial drone and carrying case utility meter read system comprising:

a carrying case comprising a top panel, a bottom panel, a plurality of side panels, and a front access panel that opens to provide access to an interior compartment of the carrying case, wherein the top panel is lined with a top non-metallic stiffener plate and the bottom panel is lined with a bottom non-metallic stiffener plate comprising a plurality of bottom plate holes;

a plurality of nylon straps surrounding the carrying case;

a plurality of non-metallic hangers sewn into the nylon straps surrounding the carrying case;

a foam block that fits within the interior compartment of the carrying case and is positioned on the bottom panel, wherein a foam block cavity is cut out from the foam block to securely hold command link hardware, wherein the foam block cavity aligns with the plurality of bottom plate holes; and an attachment mechanism to secure the carrying case to an aerial drone for flight mounting.

2. The aerial drone and carrying case utility meter read system of claim 1, wherein the bottom panel, the top panel, and the plurality of side panels of the carrying case are lined with waterproof poly fabric and internal high density foam padding.

3. The aerial drone and carrying case utility meter read system of claim 2, wherein the top panel and the plurality of side panels of the carrying case are further lined with a Faraday fabric to shield the command link hardware from exterior EMF and EMI signals.

4. The aerial drone and carrying case utility meter read system of claim 3, wherein the bottom panel of the carrying case is not lined with the Faraday fabric to enable the command link hardware to read utility meters through the bottom plate holes.

5. The aerial drone and carrying case utility meter read system of claim 1, wherein each nylon strap surrounding the carrying case is thirty-two millimeters wide.

6. The aerial drone and carrying case utility meter read system of claim 1, wherein the front access panel comprises hook and loop fasteners that attach to panel edge hook and loop fasteners.

7. The aerial drone and carrying case utility meter read system of claim 1, wherein the attachment mechanism comprises a plurality of hook and loop cinching straps to secure the carrying case to the aerial drone for flight mounting.

8. The aerial drone and carrying case utility meter read system of claim 1, wherein the attachment mechanism comprises a universal mount plate.

9. The aerial drone and carrying case utility meter read system of claim 1, wherein the carrying case is a partial access panel utility meter read equipment carrying case and the front access panel is a bifurcated front access panel comprising a top half access flap and a bottom half rigid front panel.

* * * * *